June 28, 1955  R. E. FARISON  2,712,111
ELECTRICAL CONDUCTIVITY TESTING APPARATUS
Filed May 12, 1950  4 Sheets-Sheet 1

Inventor:
Robert E. Farison,
By Schroeder, Merriam,
Hofgren & Brady, Attys.

June 28, 1955 R. E. FARISON 2,712,111
ELECTRICAL CONDUCTIVITY TESTING APPARATUS
Filed May 12, 1950 4 Sheets-Sheet 2
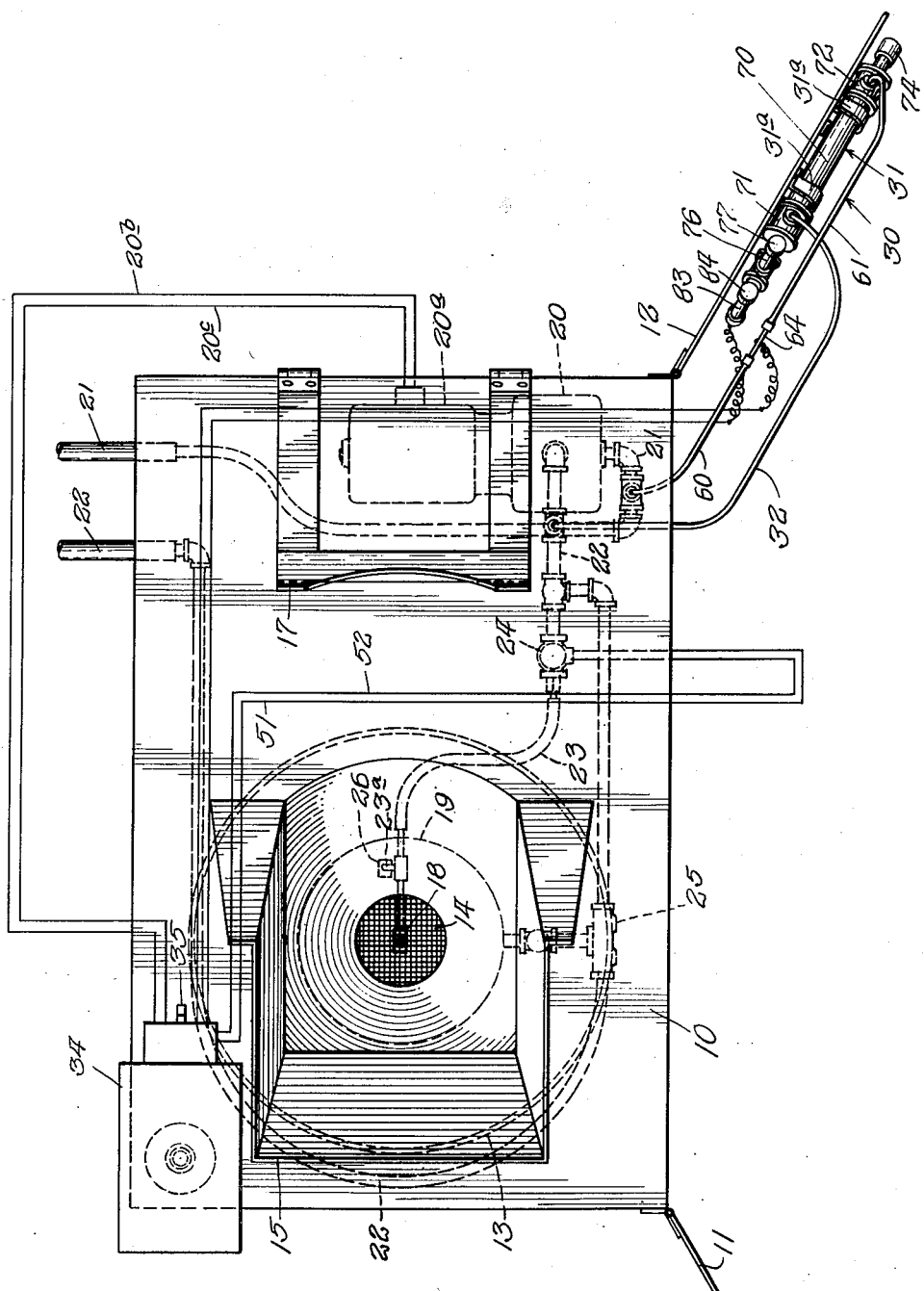
Inventor:
Robert E. Farison,
By Schroeder, Merriam,
Hofgren & Brady, Attys.

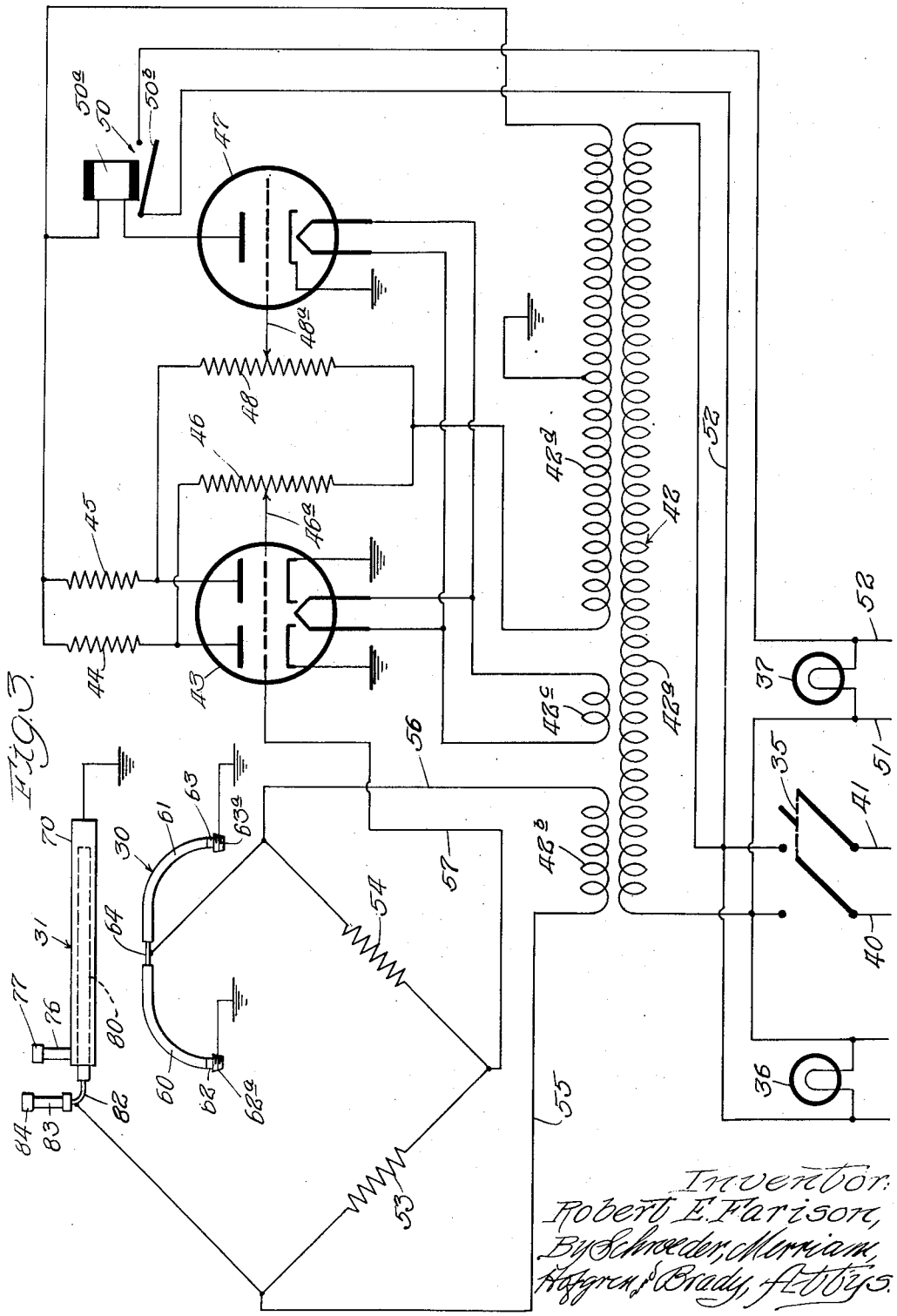

June 28, 1955
R. E. FARISON
2,712,111
ELECTRICAL CONDUCTIVITY TESTING APPARATUS
Filed May 12, 1950
4 Sheets-Sheet 4
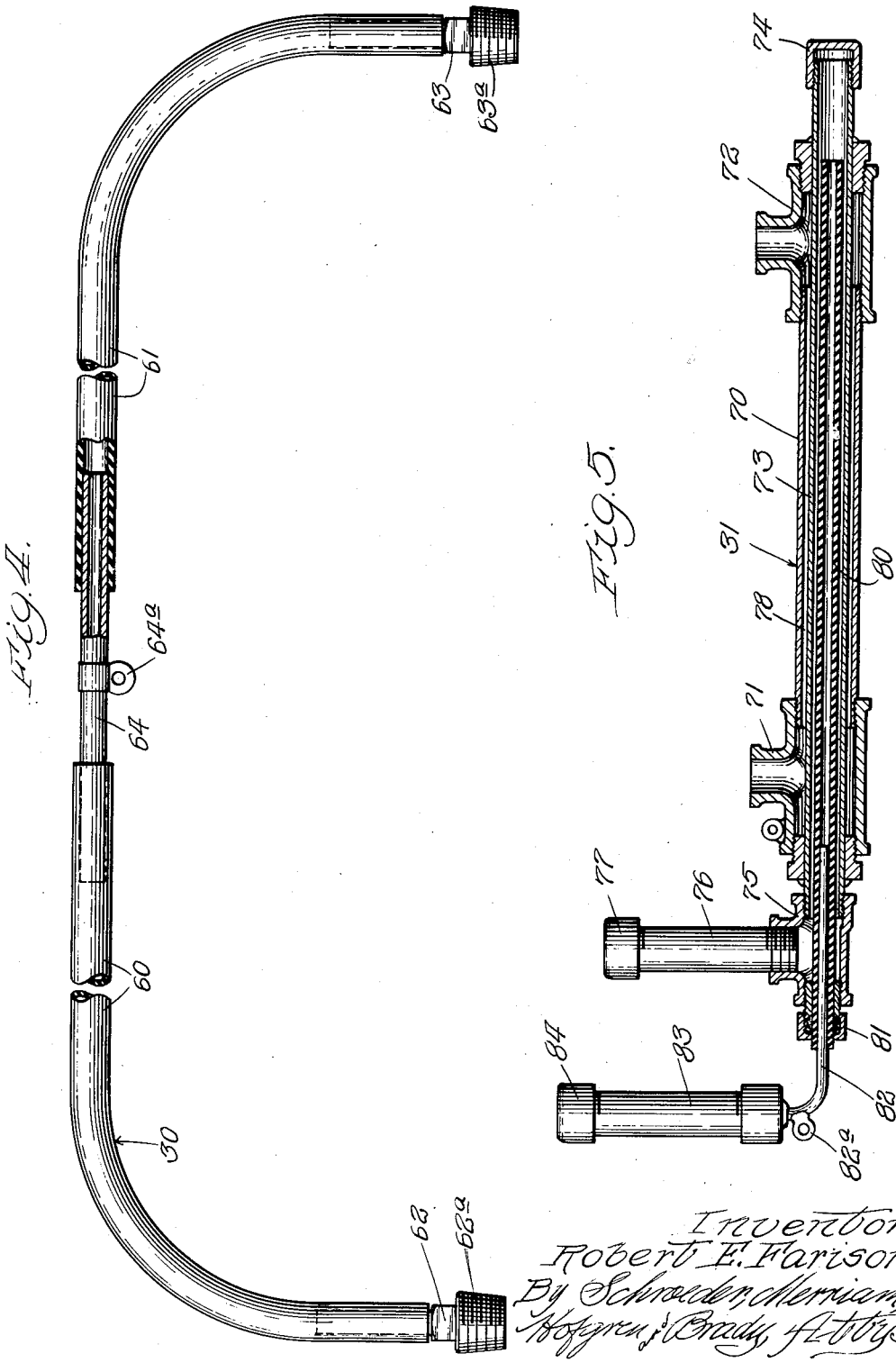

United States Patent Office 2,712,111
Patented June 28, 1955

2,712,111
ELECTRICAL CONDUCTIVITY TESTING APPARATUS

Robert E. Farison, Chicago, Ill., assignor to The Diversey Corporation, a corporation of Illinois Application May 12, 1950, Serial No. 161,533

9 Claims. (Cl. 324—30)

This invention relates to electrical conductivity testing apparatus, and more particularly to conductivity testing apparatus including improved conductivity testing cells.

In regulating certain characteristics of a liquid, as for example the concentration of a washing solution, it is common practice to utilize the electrical conductivity of the solution as a criterion of solution strength. Various kinds of testing apparatus have been developed for measuring the electrical conductivity of a solution, and for utilizing changes in electrical conductivity to control some means for adding a chemical to the solution to increase its strength when necessary. Since the electrical conductivity varies with the temperature, it is often necessary to provide some means of temperature compensation.

The apparatus disclosed herein is particularly designed for controlling the concentration of a washing solution, as a solution utilized in a bottle washing machine. The solution used is quite highly conductive and also has a deleterious effect on the platinized electrodes of commercially obtainable measuring cells. Conductivity cells have a "cell constant" determined as a factor of the cross sectional area of the current path between the electrodes, the length of the path, and the size of the electrodes. Most commercially available conductivity cells have cell constants in range from 0.1 to 10 and when used with highly conductive solutions such as washing solutions, the electrical resistance of the cell is quite low. For example, a conductivity cell having a cell constant of 2 will have a resistance of about 6 ohms when used with a 5% caustic solution at a temperature of 150° F. While in most cells the electrodes are platinized to reduce polarization errors in the event an insulating film forms on the electrodes, these cells are highly inaccurate in a washing system such as disclosed herein. During use of the cell, a film of hydrogen gas may be formed on the electrodes by electrolysis. Inasmuch as the over-all resistance of the cell is low, such an insulating film causes a high percentage increase in the cell resistance and throws the entire system off calibration. Commercially obtainable cells are quite dependent upon the platinum coating, and the cell accuracy is dependent upon the quality of the coating. Because of this operating characteristic of the cells and because of the likelihood that the cells may be damaged mechanically, it is common practice to clean the cells daily by suspending them in a hydrochloric acid solution overnight.

A principal feature of the invention is that it provides a self-cleaning cell which is highly accurate and which may be used continuously over a period of many months without cleaning or other attention. Furthermore, the cell is designed to have a high cell constant and a high over-all resistance so that small ohmic changes in the resistance will have only a negligible effect upon the over-all resistance and the cell will remain accurate.

According to the invention the test cell comprises alternate lengths of insulating tubing and conductive tubing (electrodes) which together form a substantially unimpeded channel for a flowing liquid, said liquid flowing over the entire surface of the bores of the electrodes with substantial velocity to keep said surfaces clean. In the embodiment shown the bore of each electrode is of no greater cross-sectional area than the bore of the insulating tubing, and may be smaller than the bore of the insulating tubing. If desired the bore of the electrode may have a greater cross-sectional area than the bore of the tubing, although the construction illustrated provides better self-cleaning action. The insulating tubing has a length between electrodes many times the diameter of its bore to provide a high over-all resistance for the cell, and when the cell is connected in circuit with a pump to create a drop of at least several pounds per square inch in the pressure of liquid flowing between the electrodes, the electrodes are self-cleaning and require no maintenance for months at a time. The arrangement is such that the electrodes may, if desired, comprise part of an associated apparatus, as for example, the pump structure, thus reducing to a minimum the number of parts required and providing an efficient grounding arrangement to eliminate varying resistance current paths around the channel formed by the bore of the tubes and electrodes.

The invention includes a novel standard or comparison cell which utilizes a mass of conductive solution as a part of the current path, thus reducing the number of electrodes therein. The comparison cell is further advantageous in being constructed so that it may be filled with a standard solution without danger of getting air bubbles in the cell to change the resistance thereof; and the cell is constructed so that the liquid therein moves with temperature change to provide an automatic flushing action.

The invention will be described as related to the embodiment set out in the accompanying drawings, in which:

Fig. 2 is a fragmentary plan view of the apparatus of Fig. 1 with the chemical drum removed;

Fig. 3 is a schematic diagram of the control circuit;

Fig. 4 is an enlarged side elevational view, partly in section of the test cell removed from its mounting, part of the cell being broken away; and, Fig. 5 is an enlarged longitudinal cross-section view through the comparison cell, this cell being removed from its mounting.

Figure 1:
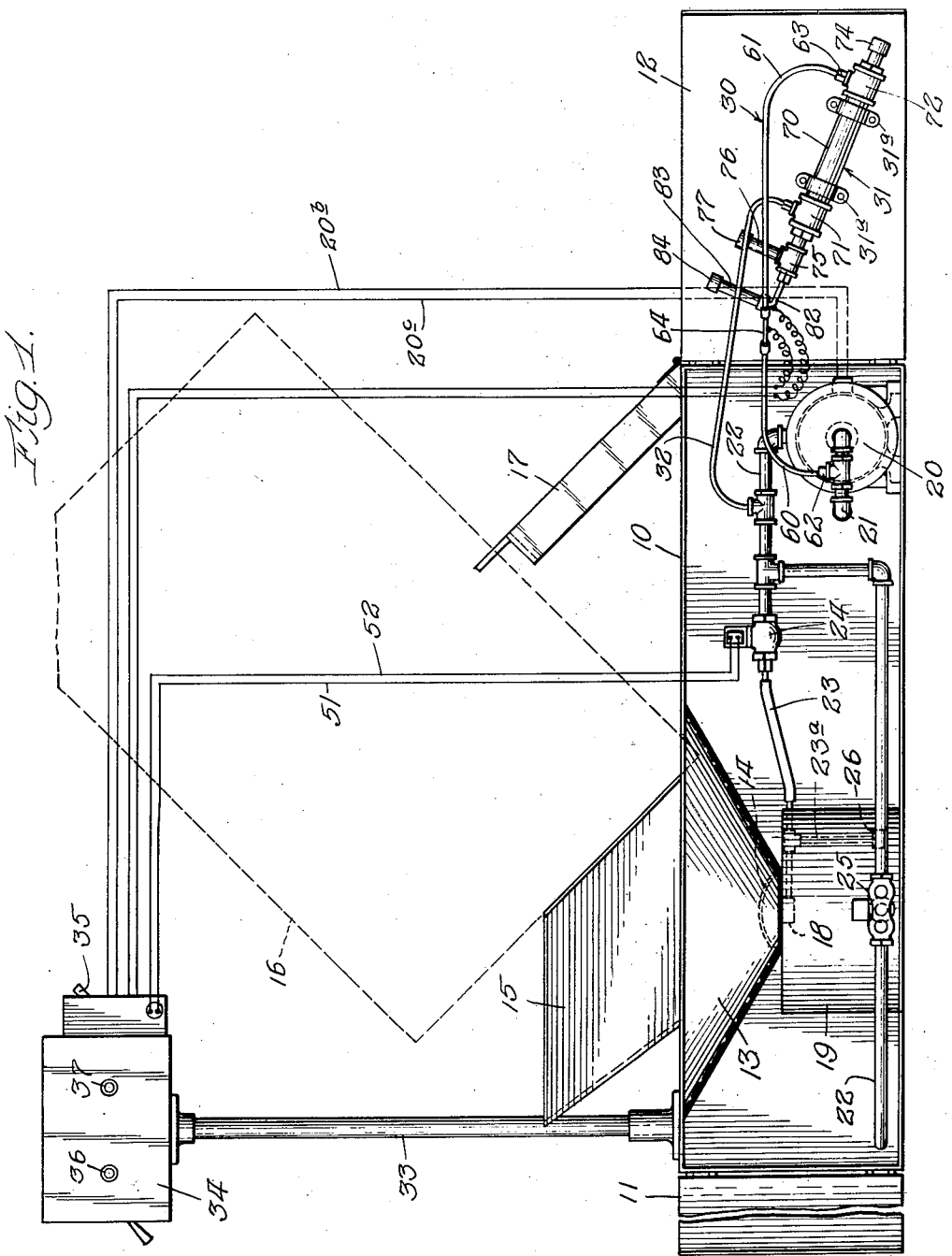
Fig. 1 is a side elevational view of a concentration control system including the invention.

The control apparatus of Fig. 1 includes a housing 10 having access doors 11 and 12 hingedly mounted on the front thereof. These doors would be closed during normal operation. Within the housing is a hopper 13 in the form of a frustum of an inverted cone having in its bottom portion a hemispherical screen 14. Extending from the top of the housing is an upper hopper and drum rest 15 forming a chute or guideway for a solid chemical or other material which may be contained in a drum 16 shown supported in inverted position on the housing by means of the drum rest 15 and a hinged drum support 17. A spray nozzle 18 is positioned below the screen 14 so as to direct a spray against the bottom of the screen, and a collection pot 19 is provided below the screen 14 to receive solution dissolved by the spray. For a complete description of the construction and operation of this feeding apparatus, reference may be had to the co-pending application of Robert E. Farison and John H. Warton entitled "Spray Type Material Dispenser," filed May 12, 1950, as Serial No. 161,534.

A fluid system is provided including a circulating pump 20 driven by a motor 20a (Fig. 2) and having an inlet pipe 21 and an outlet pipe 22. The inlet 21 leads from the tank of the bottle washing machine or other apparatus where the washing solution is utilized, and the outlet pipe 22 leads back to said tank. A branch 23 on the outlet pipe leads to the nozzle 18, this branch incorporating a solenoid valve 24 and having a branch 23a which leads to a flush spray device 26 near the bottom of the collection pot. The outlet pipe 22 includes an ejector mechanism 25 in the collection pot 19 for drawing concentrated solution from the collection pot into the outlet pipe 22. Since the spray nozzle 18 and the flush spray 26 operate simultaneously, the orifice opening in the flush spray is made relatively small so that there will be ample back pressure at the spray nozzle 18 and so that the ejector mechanism 25 can handle the combined liquid volume of the two sprays. The novel control apparatus is connected between the outlet 22 and the inlet 21 adjacent the pump and includes a control cell designated generally at 30 and a comparison cell designated generally at 31. One end of the control cell is connected to the inlet pipe 21 adjacent the pump; the other end is connected to one end of the comparison cell; and the other end of the comparison cell is connected by a pipe 32 to the outlet pipe 22 adjacent the pump. The comparison cell is mounted on the inner wall of the door 12 by brackets 31a. The particular construction of these cells will be described in detail after the general operation of the system is described.

A standard 33 is mounted on the top of the housing 10 and carries at its upper end a control panel housing 34 which houses an electrical control circuit. On the outside of the panel housing 34 is an on-off switch 35 and two pilot lights 36 and 37 to indicate respectively when the pump 20 and nozzle 18 are operating.

While the electrical control circuit per se comprises no part of the invention, to provide a full understanding of the operation of the system the control circuit will be described. This circuit is shown schematically in Fig. 3 and comprises a multi-stage amplifier. Power for the amplifier is supplied through power leads 40 and 41 which may be connected to a voltage source, as for example, a conventional commercial source of 110 volt, 60 cycle alternating current. The leads 40 and 41 incorporate the on-off switch 35 and are connected across the primary 42a of a power transformer 42. This transformer has a secondary 42b which may supply a voltage of the order of 15 volts for the input circuit of the amplifier. Another secondary 42c provides filament voltage for the amplifier tubes. This voltage may be of any suitable value, as for example, six volts in the apparatus illustrated. A third secondary 42d provides plate voltage for the amplifier tubes. This secondary is shown as having a grounded center tap and may provide a potential of 75 volts across each half of the secondary.

The first amplifier stage comprises a twin triode tube 43 which may be of tube type No. 6SC7 having its cathodes connected to ground and having its anodes connected to one end of the transformer secondary 42d through suitable voltage dropping resistors 44 and 45, respectively, which may each have a value of 100,000 ohms. The left anode of the tube (as the parts appear in the drawing) is also connected to the other end of the transformer secondary 42d through a voltage dropping potentiometer 46, the movable tap 46a of which is connected to the right hand grid of the tube 43 to provide resistance coupling between each half of the tube and to provide a variable grid bias for the right hand grid of the tube. The right hand anode of the tube 43 is resistance coupled to the grid of the tube 47 of the second stage, a potentiometer 48 being connected between said anode and the transformer secondary 42d and the movable tap 48a of this potentiometer being connected to the grid of the tube 47. The anode of the tube 47 is connected to the B+ supply through the operating coil 50a of a relay 50 having normally open contacts 50b which form a switch in the circuit of the solenoid valve 24 (Figs. 1 and 2) to control the operation of the spray 18. As may be seen from Figs. 1, 2 and 3, the solenoid valve 24 is connected by leads 51 and 52 to the control panel. These leads are connected across the power leads 40 and 41, and one of the leads (the lead 52 as shown) incorporates the normally open relay contacts. The variable grid bias provided by the potentiometers 46 and 48 provides a range of adjustment for operation of the relay.

The voltage output of the tube 47, and consequently the operation of the relay, is controlled by the input circuit of the tube 43. This input circuit comprises a Wheatstone bridge having the control cell 30 and the comparison cell 31 in two respective arms and having balancing resistors 53 and 54 (which may each have a value of 500 ohms) in the opposite respective arms. Two opposite corners of the bridge are connected across the secondary 42b by leads 55 and 56, and the other two opposite corners of the bridge are connected between the grid of tube 43 (by lead 57) and ground so that variations in the resistance of the cells 30 and 31 varies the input voltage applied to the tube 43. As will hereafter appear, the cell 31 contains a standard solution and its resistance varies only as a function of the temperature of the solution. The cell 30 contains the actual washing solution and its resistance varies not only in accordance with temperature changes, but also in accordance with changes in the concentration of the solution. Inasmuch as the control cell 30 and the comparison cell 31 are maintained at the same temperature, automatic temperature compensation is obtained and the only variation which affects the input voltage for the tube 43 is the variation in the resistance caused by variations in concentration of the solution.

The general operation of the system will be apparent from Figs. 1, 2 and 3. The motor 20a is connected to leads 40 and 41 by leads 20b and 20c, and whenever the switch 35 is closed, the motor driven pump 20 operates. However, when the relay contacts 50b are open the solenoid valve 24 is shut off and prevents operation of the spray 18. Whenever the relay contacts are closed the solenoid valve permits liquid to flow under pressure through pipe 23 to the spray, and this liquid is sprayed through the screen 14 and dissolves chemicals adjacent thereto to form a concentrated solution in the collection pot 19. This solution is drawn into the outlet pipe and fed to the washing machine. Inasmuch as the fluid in the system is constantly circulated under pressure, that portion of the fluid which flows through the channel formed by the cell 30 and the jacket of cell 31 will vary in concentration as the solution in the washing tank varies. When the concentration is low, the resistance of the control cell 30 increases, applying a more positive voltage to the left hand grid of the tube 43. This increases the conductivity of this tube and causes the plate voltage to drop, and this negative change is coupled into the right hand grid of the tube, causing the anode of this portion of the tube to become more positive. This positive change is coupled into the grid of the tube 47, causing this tube to conduct more current, and when the tube conducts sufficient current, the relay contacts close. The point of relay operation may be adjusted by the potentiometers 46 and 48. As the solution becomes more concentrated, the resistance of the control cell 30 drops, and when the solution in the control cell rises to a concentration slightly in excess of that contained in the comparison cell, the relay will be caused to open, shutting the solenoid valve 24 and stopping operation of the spray 18.

The novel test cell is shown in Fig. 4. The cell comprises a pair of similar elongated tubes 60 and 61 of dielectric material of equal length. Each tube has a length equal to many times the diameter of its bore, the tubes illustrated each having a length of the order of 26 inches and a bore diameter of about 3/16 inch, and the tubes are preferably, though not necessarily, of flexible material. The tubes illustrated have rubber walls 3/32 inch thick. A pair of similar tubular electrodes are associated with the tube, these electrodes being designated at 62 and 63, respectively, and each being mounted at one end of one of the tubes 60 and 61. The electrodes are of conducting material, as for example, stainless steel, and each has a bore of smaller diameter than the bores of the tubes. In the apparatus illustrated, the electrodes 62 and 63 comprise tubes of 22 gauge stainless steel having an outer diameter of 3/16 of an inch. The electrodes are about 1 and 5/8 inches long, and each electrode is inserted into an end of each of the rubber tubes for a distance of about 1 inch, and the outer end of each electrode has brazed thereon a threaded plug designated at 62a and 63a, respectively.

A third tubular electrode 64 is mounted between the other ends of the tubes 60 and 61 to join said tubes together. This electrode may comprise a 3 and 1/2 inch piece of 22 gauge stainless steel having an outer diameter of 3/16 of an inch. This electrode is inserted into each rubber tube a distance of 1 inch to make the effective or insulating length of each rubber tube 24 inches. An electrical contact 64a is soldered or otherwise secured at the center of the electrode 64 as shown. It will be noted that the cell provides a long current path having a small cross sectional diameter so that the resistance of the cell will be much higher than the resistance of most commercially obtainable cells, and the cell may be constructed to have a cell constant of 100 or more as contrasted with a cell constant of a maximum of 10 found in most commercially obtainable cells. It will be further noted that the bores of the tubes and the electrodes form together a substantially unimpeded channel for liquid flowing in the system. The entire surface of the bore in each electrode is contacted by fluid moving at a substantial velocity under relatively high pressure, and the construction is such that there is substantially no impedance to flow of liquid in the channel at the point where the channel passes from the tubes to the electrodes. With this construction, the cell is self-cleaning and a similar cell has been in use for a period of more than six months without having once been removed or cleaned. Because of the high resistance of the cell, resistance variations of one or two ohms caused by a film forming at the electrodes has a negligible effect on the overall resistance and does not result in appreciable error of calibration. The cell is constructed with three electrodes in order to eliminate varying resistance current paths around the fluid channel and extraneous thereof. In operation, as may be seen from Figs. 1 and 3, the end electrodes 62 and 63 are grounded, one being grounded through the pump 20, and the other being grounded through the comparison cell 31 so that the two halves of the cell are connected in parallel. Consequently the effective resistance of the cell is that of a single tube which is 12 inches long between the electrodes.

The comparison cell is shown in Fig. 5. This cell comprises an outer jacket which may be formed of a pipe 70 having at each end thereof a T-coupling 71 and 72. The pipe 70 may be a three-quarter inch pipe, if desired. Within the jacket formed by the pipe 70 is a container comprising a metallic pipe 73 which extends through the T-couplings and is closed at one end by a cap 74. At the other end, the pipe 73 extends through the T 71 and carries another T-coupling 75 upon which is mounted an upwardly extending filling pipe 76 having a removable filling cap 77 thereon. The pipe 73 may be a 3/8 inch pipe having a length of 14 1/2 inches. Together the pipes 70 and 73 and their associated fittings form a jacket providing an annular space 78 for the passage of liquid between the T-couplings 71 and 72. An insulating tube 80 is mounted within the container formed by the pipe 73, this tube extending through the T-coupling 75 and being sealed therein by a compression fitting packing gland 81. The tube 80 has an outer diameter smaller than the inner diameter of the pipe 73 and may comprise a 3/16 inner diameter rubber tube having 3/32 inch thick walls similar to the tubes 60 and 61 of Fig. 4. The tube shown may be 15 inches long, and in one end of the tube may be inserted a tubular electrode 82 comprising a 22 gauge stainless steel tube of the same type as the electrodes of Fig. 4. This electrode is inserted into the end of the tube for a distance of 3 inches, so that the effective length of the insulating bore of the tube is 12 inches. An electrical contact 82a is secured to the electrode 82, and the electrode 82 opens into an expander chamber which may be formed by a pipe 83 having a sealing cap 84 thereon. The sealed pipe 83 extends above the level of the removable cap 77 on the fill pipe for a purpose to be hereafter described.

As may be seen in Fig. 1, the cells 30 and 31 are connected in series across the pump so that liquid under pressure flows with substantial velocity through the cell 30 and through the space 78. The pump should create a pressure drop of several pounds per square inch in the pressure of liquid flowing between the electrodes 62 and 63 of the cell 30, and this pressure drop preferably should be at least 4 pounds per square inch to develop the substantial velocity desired in the movement of the liquid through the cell. The cell is capable of making accurate electrical measurements if filled with a solution which is not in motion, although this arrangement will not provide self-cleaning of the electrodes. Inasmuch as liquid flows through the annular space 78 provided by the outer jacket of the cell 31, automatic temperature compensation is obtained since the liquid in the test cell is the same temperature as the liquid in the comparison cell.

The construction of the comparison cell provides several advantages. In the first place, it is only necessary to use one electrode in the tube 80, and the cell provides a long current path including a relatively high resistance portion provided by liquid in the bore of the tube 80 and a second relatively low resistance portion provided by liquid external of said bore. Inasmuch as the distance between the electrode 82 and the end of the tube 80 is many times the distance between the end of the tube 80 and the container 73, and inasmuch as there is a relatively large volume of liquid in the end of the container 73, the very small resistance of the cell illustrated effectively matches the resistance of the cell of Fig. 4 to provide a balanced bridge in the circuit of Fig. 3.

The cell provides another advantage in its construction, since the long tubular channel through the tube 80 can be filled with standard solution with no danger of getting air bubbles into the channel to change the resistance of the cell. Since the cell is filled through the pipe 76 which leads to the annular space between the container 73 and the tube 80, the liquid must enter said container before it flows into the bore of the tube 80, and the liquid is given a chance to free itself of entrapped air so that proper filling of the bore of the insulating tube is assured. Proper filling would not be assured if the cell were filled through the electrode unless the expanded section of the electrode were kept filled constantly so that air separation would occur before the liquid entered the narrow channel.

The standard cell of Fig. 5 incorporates another advantage in that it provides automatic flushing or movement of liquid in the cell with temperature changes. Inasmuch as the expanded chamber formed by the tube 83 extends above the level of the filled tube 76, when the cell is filled with liquid and the tube 76 is filled to the brim and then both tubes are sealed with the respective caps 77 and 84, an air space comparatively large in size exists above the liquid level in the pipe 83 as compared with the air space in the pipe 76. Thus, as the mass of liquid in the cell expands and contracts with temperature changes there is necessarily an accompanying movement of liquid from one pipe to the other. This flushing arrangement is of considerable importance where the conductivity characteristics of the solution change with the passage of time.

While I have shown and described certain embodiments of my invention, it is to be understood that it is capable of many modifications. Changes, therefore, in

I claim:

1. A self-cleaning cell for measuring the electrical conductivity of a liquid, comprising: a pair of similar elongated tubes of dielectric material; a pair of similar tubular conducting electrodes each mounted at one end of one of said tubes; a third tubular conducting electrode mounted between the other ends of said tubes to join said tubes together, said tubes being of equal length between electrodes and the bores of said tubes and electrodes forming together a channel for a flowing liquid wherein there is substantially no impedance to flow of liquid at the points where the channel passes from the tubes to the electrodes; and pump means for causing said liquid to flow over the entire surface of the bore of each electrode at a sufficient velocity to prevent the formation of insulating film composed of matter from the liquid on said surfaces.

2. A self-cleaning cell for measuring the electrical conductivity of a liquid, comprising: a pair of similar elongated flexible tubes of dielectric material, each having a length equal to many times the diameter of its bore; a pair of similar tubular conducting electrodes each mounted at one end of one of said tubes; a third tubular conducting electrode mounted between the other ends of said tubes to join said tubes together, said tubes being of equal length between electrodes and the bores of said tubes and electrodes forming together a channel for a flowing liquid wherein there is substantially no impedance to flow of liquid at the points where the channel passes from the tubes to the electrodes; pump means for causing said liquid to flow over the entire surface of the bore of each electrode at a sufficient velocity to prevent the formation of insulating film composed of matter from the liquid on said surface; and means for connecting said pair of electrodes to ground to eliminate varying resistance current paths around said channel and extraneous thereof.

3. Apparatus of the character claimed in claim 2, wherein each tube has a length of the order of twenty-four inches between electrodes and a bore diameter of the order of one-quarter inch.

4. In a fluid system, in combination: a pump; and a cell for measuring the electrical conductivity of said liquid comprising a pair of similar elongated tubes of dielectric material each having a length equal to many times the diameter of its bore, a pair of similar tubular conducting electrodes each mounted at one end of one of said tubes, and a third tubular conducting electrode mounted between the other ends of said tubes to join said tubes together, one of said pair of electrodes being connected to said pump and the bores of said tubes and electrodes forming together a substantially unimpeded channel for liquid flowing under pressure in said system, said pump comprising means to cause said liquid to flow at a sufficient velocity to prevent the formation of insulating film composed of matter from the liquid over the entire surface of the bore of each electrode.

5. In a fluid system, in combination: a pump; a cell for measuring thne electrical conductivity of said liquid comprising a pair of similar elongated tubes of dielectric material, a pair of similar tubular conducting electrodes each mounted at one end of one of said tubes and a third tubular conducting electrode mounted between the other ends of said tubes to join said tubes together, said tubes being of equal length between electrodes; and a comparison cell having a jacket for said liquid to flow through to keep said measuring and comparison cells at the same temperature, one of said pair of electrodes of said measuring cell being connected to said pump and the other of said pair of electrodes being connected to said jacket, and the bores of said tubes and electrodes and said jacket forming together a substantially unimpeded channel for liquid flowing under pressure in said system, said pump comprising means to cause said liquid to flow at a sufficient velocity to prevent the formation of insulating film composed of matter from the liquid on the surface of the bore of each electrode, and said pump and jacket providing a ground connection for said pair of electrodes to eliminate varying resistance current paths around said channel and extraneous thereof.

6. An electrical conductivity cell for a liquid, comprising: a closed container; an elongated dielectric tube in said container, said tube having a bore which opens into said container; at least one electrode in said bore spaced from said opening; a fill pipe extending upwardly from said container and communicating therewith, said full pipe having a removable cap; a second pipe communicating with said bore on the opposite side of said opening from said electrode; and a cap for sealing said second pipe, said second pipe extending upwardly above said fill pipe to provide an air space in said second pipe when said cell has been filled with liquid to the top of the fill pipe.

7. Apparatus of the character claimed in claim 6, wherein said second pipe extends above the level of said removable cap to provide a larger air space in said second pipe than in said fill pipe when the cell has been filled with liquid to the top of the fill pipe.

8. Apparatus of the character claimed in claim 7, wherein said second pipe and fill pipe have substantially equal cross-sectional area, which area is larger than the cross-sectional area of said bore.

9. A self-cleaning cell for measuring the electrical conductivity of a liquid, comprising: a pair of similar elongated tubes of dielectric material; a pair of similar tubular conducting electrodes each mounted at one end of one of said tubes; a third tubular conducting electrode mounted between the other ends of said tubes to join said tubes together, the bores of said tubes and electrodes forming together a channel for a flowing liquid wherein there is substantially no impedance to flow of liquid at the points where the channel passes from the tubes to the electrodes; and pump means for causing said liquid to flow over the entire surface of the bore of each electrode at a sufficient velocity to prevent the formation of insulating film composed of matter from the liquid on said surfaces.

References Cited in the file of this patent

UNITED STATES PATENTS

| Number | Name | Date |
|---|---|---|
| 1,734,342 | Perry | Nov. 5, 1929 |
| 2,122,363 | Christie | June 28, 1938 |
| 2,330,394 | Stuart | Sept. 28, 1943 |
| 2,377,501 | Kinley | June 5, 1945 |
| 2,422,873 | Wolfner | June 24, 1947 |
| 2,482,078 | Wallace | Sept. 13, 1949 |
| 2,486,432 | Otto | Nov. 1, 1949 |